(12) United States Patent
Sabony

(10) Patent No.: US 12,717,630 B2
(45) Date of Patent: Aug. 25, 2026

(54) NETWORK-ATTACHED HOSTLESS ACCELERATOR DEVICES

(71) Applicant: ADVANCED MICRO DEVICES, INC., Santa Clara, CA (US)

(72) Inventor: Mazda Sabony, Grasbrunn (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 1 day.

(21) Appl. No.: 18/121,366

(22) Filed: Mar. 14, 2023

(65) Prior Publication Data

US 2024/0311191 A1 Sep. 19, 2024

(51) Int. Cl.

*G06F 9/30* (2018.01)
*G06F 3/06* (2006.01)
*G06F 9/50* (2006.01)
*G06F 9/54* (2006.01)
*G06F 12/084* (2016.01)

(52) U.S. Cl.

CPC ........... *G06F 9/5027* (2013.01); *G06F 3/067* (2013.01); *G06F 9/54* (2013.01); *G06F 9/30043* (2013.01); *G06F 12/084* (2013.01)

(58) Field of Classification Search

CPC .......... G06F 9/5027; G06F 3/067; G06F 9/54; G06F 9/30043; G06F 12/084
See application file for complete search history.

(56) References Cited

U.S. PATENT DOCUMENTS

| | | | | |
|---|---|---|---|---|
| 9,553,822 B2 * | 1/2017 | Mickens | H04L 47/70 |
| 10,599,548 B2 * | 3/2020 | Wang | G06F 11/3037 |
| 10,681,173 B2 * | 6/2020 | Sofia | H04L 67/51 |
| 11,030,126 B2 * | 6/2021 | Koufaty | G06F 3/0604 |
| 11,934,663 B2 * | 3/2024 | Radi | G06F 3/067 |
| 11,940,917 B2 * | 3/2024 | Glimcher | G06F 12/0824 |
| 2022/0156566 A1 * | 5/2022 | Jeon | H04L 65/612 |
| 2022/0263913 A1 * | 8/2022 | Zhang | G06F 3/0604 |
| 2023/0110285 A1 * | 4/2023 | Pardo | G06N 3/063 706/26 |
| 2023/0129511 A1 * | 4/2023 | Merwaday | G06N 3/08 706/25 |

* cited by examiner

*Primary Examiner* — Corey S Faherty

(57) ABSTRACT

A processing system includes one or more network-attached hostless accelerator (NAHA) units each having an integrated circuit. The integrated circuit of each NAHA unit includes a memory and a first network interface controller configured to communicatively couple the memory to a network such that the memory of the NAHA unit is communicatively coupled to one or more memories of other NAHA units via the network. Additionally, a NAHA unit of the processing system includes one or more processor cores configured to execute an instruction to generate a result. Further, the one or more processor cores of the NAHA unit are configured to store the result in the one or more memories of the other NAHA units.

20 Claims, 7 Drawing Sheets

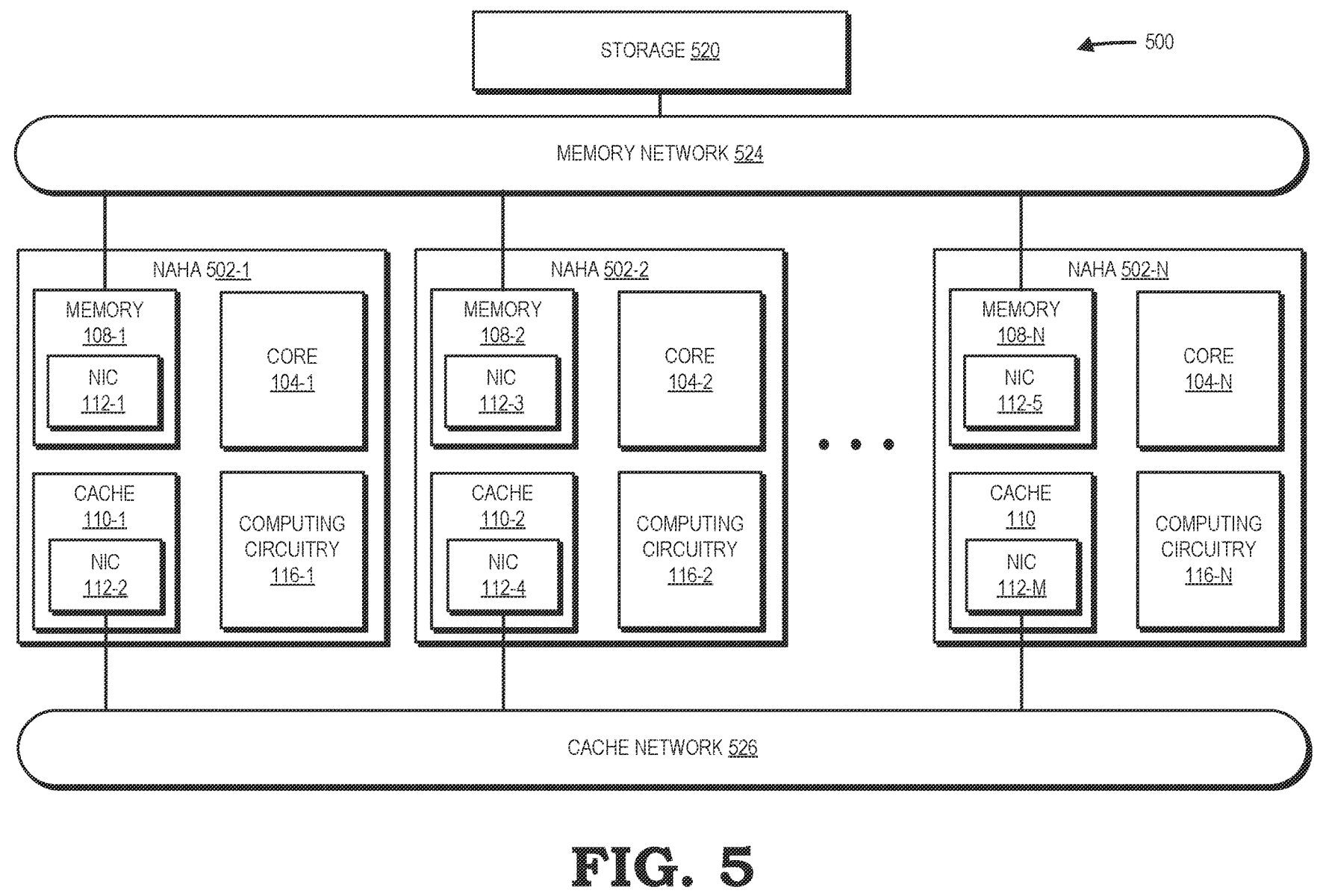

500

STORAGE 520

MEMORY NETWORK 524

NAHA 502-1
MEMORY 108-1
NIC 112-1
CACHE 110-1
NIC 112-2
CORE 104-1
COMPUTING CIRCUITRY 116-1

NAHA 502-2
MEMORY 108-2
NIC 112-3
CACHE 110-2
NIC 112-4
CORE 104-2
COMPUTING CIRCUITRY 116-2

NAHA 502-N
MEMORY 108-N
NIC 112-5
CACHE 110
NIC 112-M
CORE 104-N
COMPUTING CIRCUITRY 116-N

CACHE NETWORK 526

FIG. 5

NETWORK-ATTACHED HOSTLESS ACCELERATOR DEVICES

BACKGROUND

Some processing systems include multiple processing devices (e.g., central processing units, graphics processing units) each connected to a network and configured to execute instructions, perform operations, or both on behalf of executing applications. Typically, such processing systems also include peripheral devices, such as peripheral component interconnect (PCI) network adaptors, to connect these processing devices to the network. Additionally, such processing systems typically include one or more discrete host devices configured to issue instructions for the executing applications to the processing devices. However, using such peripheral devices and discrete host devices makes the design of such processing systems more complex, as the design of the processing system must account for the inclusion of these devices along with the processing devices. Additionally, expanding such processing systems to include additional processing devices becomes more complex and more costly as adding processing devices to the processing system can require the inclusion of additional peripheral devices and discrete host devices.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

FIG. 5 is a block diagram of a data center including two or more NAHA units, in accordance with some embodiments.

DETAILED DESCRIPTION

Figure 1:
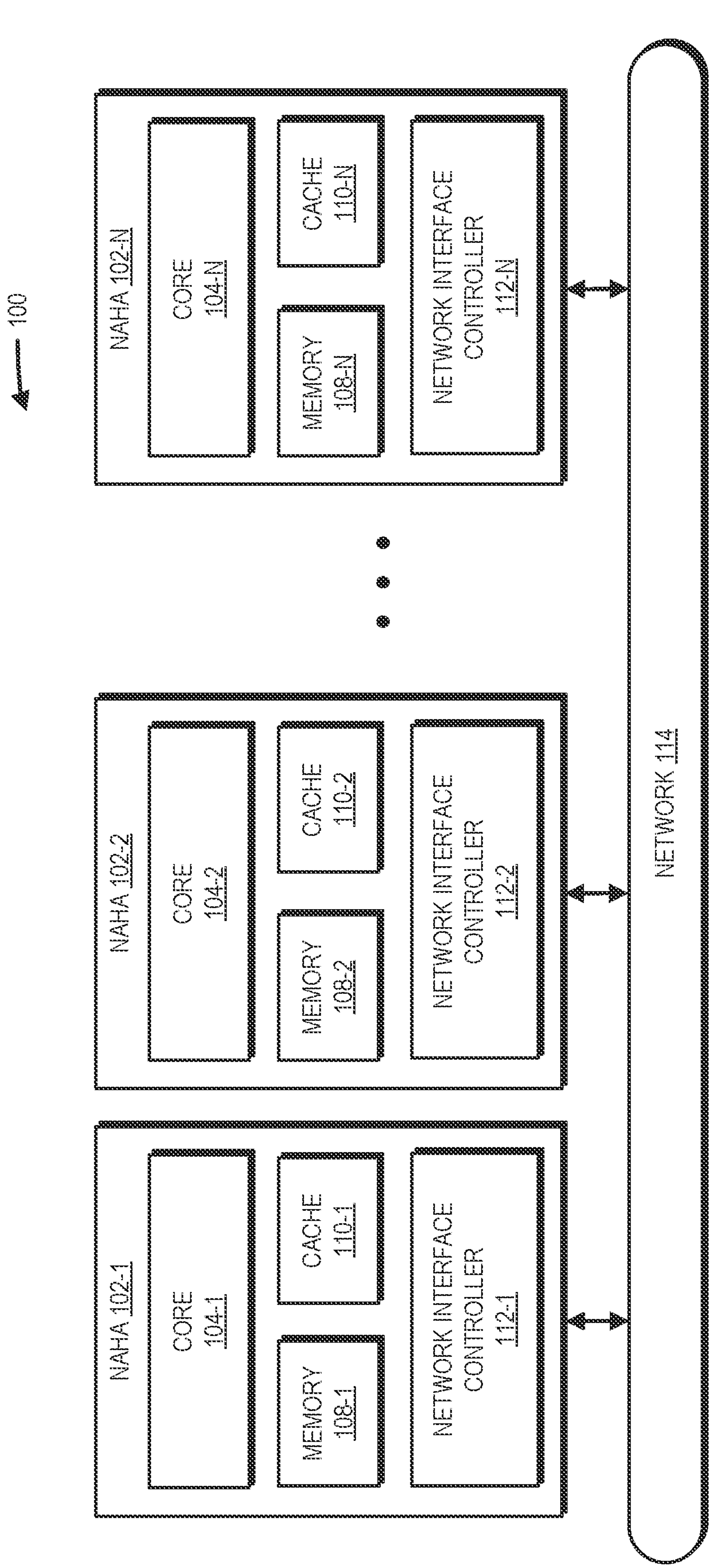
FIG. 1 is a block diagram of a processing system including one or more network-attached hostless accelerator (NAHA) units, in accordance with some embodiments.

Techniques and systems described herein address supporting the execution of high-performance applications by a processing system using network-attached hostless accelerator (NAHA) units. These high-performance applications include, for example, artificial intelligence (AI) applications, neural network applications, data center applications, high-performance compute (HPC) applications, or any combination thereof. To support the execution of such high-performance applications, a processing system includes one or more NAHA units configured to execute one or more instructions, perform one or more operations (e.g., data computation operations), or both for the applications. To this end, each NAHA unit includes an integrated circuit (e.g., system on a chip (SoC)) having one or more compute units (e.g., cores functioning as compute units) that each has one or more single instruction, multiple data (SIMD) units configured to perform operations indicated in one or more instructions of the applications. Additionally, each NAHA unit includes (e.g., in the integrated circuit) a memory and cache configured to store data (e.g., results of operations, operands, instructions, values, register files) necessary for performing such operations.

To help facilitate the performance of the instructions and operations, NAHA units each include one or more network interface controllers (NICs) within or otherwise connected to the memory of the NAHA unit, the cache of the NAHA, or both. For example, NAHA units each include one or more NICs each disposed within (e.g., disposed on the same die as) the memory of the NAHA unit, the cache of the NAHA unit, or both. These NICs are configured to communicatively couple to one or more networks using one or more communication protocols (e.g., Ethernet, Wi-Fi, Bluetooth, internet protocols, cellular protocols) such that the memory, cache, or both of the NAHA unit is connected to the network. In this way, these NICs allow the memory, cache, or both of a NAHA unit to connect to a network without the use of peripheral devices (e.g., peripheral component interconnect (PCI) devices). Additionally, such NICs allow the memories of NAHA units to connect to the memories of one or more other NAHA units via a network, the memories of NAHA units to connect to one or more storages (e.g., system storages, system memories, cloud-based storages, databases) via a network, the caches of the NAHA units to connect to caches of other NAHA units via a network, or any combination thereof. In this way, one or more NAHA units are configured to perform instructions and operations (e.g., perform edge computing or edge interfacing) for a high-performance application (e.g., AI application) executing on a distributed processing system (e.g., cloud-based processing system), perform operations for a high-performance application (e.g., AI application) on behalf of an external processing system, form at least a portion of a data center, or any combination thereof.

For example, in some embodiments, to perform edge interfacing for a high-performance application (e.g., AI application) executing on a distributed processing system (e.g., cloud-based processing system), a NAHA unit includes a NIC within or otherwise connected a memory of the NAHA unit configured to communicatively couple the memory of the NAHA unit to a cloud-based storage (e.g., system storage, system memory, database) via a network. After the memory of the NAHA unit is communicatively coupled to the cloud-based storage, the NAHA unit is configured to read and write data to and from the cloud-based storage. As an example, the NAHA unit is configured to write data resulting from performing operations and instructions for the high-performance application in the cloud-based storage. In this way, the NAHA unit performs edge interfacing for the processing system without need of a peripheral device (e.g., PCI device).

As another example, according to some embodiments, a NAHA unit includes a first NIC within or otherwise connected a memory of the NAHA unit configured to communicatively couple the memory of the NAHA unit to the memories of one or more other NAHA units via a first network, a second NIC within or otherwise connected a cache of the NAHA unit configured to connect the cache of the NAHA unit to the caches of one or more other NAHA units via a second network, or both such that the NAHA unit and one or more other NAHA units form a data center. To this end, a NAHA unit within the data center is configured to read and write data (e.g., results from operations, results from instructions, program code, variables, instructions) to and from the memories of other NAHA units connected to the first network. Additionally, a NAHA unit within the data center is configured to read, write, and check (e.g., snoop) data (e.g., results from operations, register files, variables, instructions, operands) in the caches of other NAHA units connected to the second network. For example, a NAHA unit is configured to maintain cache coherency with one or more caches of NAHA units connect to the second network by issuing snoop requests to one or more caches on the second network. In this way, a plurality of NAHA units is used to form a data center without the use of peripheral devices, discrete host devices, or both, reducing the number of elements needed to form the data center. Additionally, expanding such a data center requires only adding additional NAHA units, simplifying the process of expanding the data center and reducing cost.

FIG. 1 is a block diagram of a processing system 100 including one or more network-attached hostless accelerator (NAHA) units 102, according to some embodiments. In embodiments, processing system 100 is configured to execute one or more high-performance applications such as artificial intelligence (AI) applications, machine-learning applications, neural network applications, high-performance compute (HPC) applications, or any combination thereof. To support these high-performance applications, processing system 100 includes one or more NAHA units 102 each configured to perform one or more instructions, operations, or both for the high-performance applications executed by processing system 100. Though the example embodiment illustrated in FIG. 1 presents processing system 100 as having three NAHA units (102-1, 102-102-N) representing an N number of processing units, in other embodiments, processing system 100 may have any number of NAHA units. According to embodiments, each NAHA unit 102 includes one or more respective memories 108 or other storage components implemented using a non-transitory computer-readable medium, for example, a dynamic random-access memory (DRAM). However, in embodiments, one or more respective memories 106 of a NAHA unit 102 are implemented using other types of memory including, for example, static random-access memory (SRAM), nonvolatile RAM, solid state memory, flash memory, or any combination thereof. Though the example embodiment illustrated in FIG. 1 presents each NAHA unit 102 having one respective memory (108-1, 108-2, 108-N), in other embodiments, each NAHA unit 102 may have any number of memories 108.

In some embodiments, a memory 108 of a NAHA unit 102 is configured to store program code for one or more applications (e.g., high-performance applications). Such program code, for example, includes instructions indicating one or more operations to be performed for the application. As an example, program code stored in a memory 108 of a NAHA unit 102 includes instructions indicating operations to be performed for an AI application. To execute such instructions for one or more applications (e.g., high-performance applications), each NAHA unit 102 includes one or more respective processor cores 104. Such processor cores 104, for example, are each configured to execute, concurrently or in parallel, instructions received from program code for an application (e.g., high-performance application) stored in a memory 108 of a NAHA unit 102, a memory external to a NAHA unit 102 (e.g., a system storage, a system memory), or both. As an example, a processor core is configured to execute, concurrently or in parallel, instructions received from the program code of an AI application to generate one or more results. Additionally, to execute instructions received from program code, one or more processor cores 104 of a NAHA unit 102 each operate as a compute unit including one or more single instruction, multiple data (SIMD) units that perform the same operation on different data sets based on received instructions. That is to say, one or more processor cores 104 each operate as a compute unit including one or more SIMD units configured to perform the operations indicated in one or more instructions received from the program code of an application. Though the example embodiment illustrated in FIG. 1 presents each NAHA unit 102 as having one respective processor core (104-1, 104-2, 104-N), in other embodiments, each NAHA unit 102 may have any number of processor cores 104. To help each processor core 104 of a NAHA unit 102 execute instructions for an application (e.g., a high-performance application), each NAHA unit 102 includes one or more caches 110 each included in or otherwise connected to one or more processor cores 104 of a NAHA unit. For example, a NAHA unit 102 includes a processor core 104 having a respective cache 110 connected to the processor core 104. In embodiments, a NAHA unit 102 is configured to store data in one or more caches necessary for, aiding in, helpful for, or any combination thereof performing one or more operations for an application. For example, a NAHA unit 102 is configured to store register files, variables, instructions, operands, values, results (e.g., data resulting from the performance of one or more operations), or any combination there in one or more caches 110 (e.g., caches 110 of the NAHA unit 102).

In embodiments, one or more NAHA units 102 of processing system 100 include one or more network interface controllers (NICs) 112. Such NICs 112, for example, include hardware-based circuitry, software-based circuitry, or both configured to communicatively couple to a network 114 using one or more communication protocols. Such communication protocols, for example, include Ethernet, WI-FI, Bluetooth, internet protocols, cellular protocols, or any combination thereof. For example, a NIC 112 of a NAHA unit 102 is configured to connect to network 114 via Ethernet. In embodiments, network 114 includes, for example, a wired local area network (LAN), a wireless LAN, a wired wide area network (WAN), a wireless WAN (e.g., cellular network), or any combination thereof configured to communicatively couple to one or more NAHA units 102, storages (e.g., system storages), system memories, processing devices (e.g., computers, laptops, smartphones), or any combination such that each device connected to network 114 is communicatively coupled to one or more other devices also communicatively coupled to network 114.

According to some embodiments, one or more NAHA units 102 each include a NIC 112 within or otherwise connected to a memory 108 of the respective NAHA unit 102. For example, one or more NAHA units 102 each include a NIC 112 disposed within (e.g., disposed on the same die as) memory 108. The NIC 112 within or otherwise connected to the memory 108 is configured to communicatively couple the memory 108 to network 114 such that, for example, the memory 108 is communicatively coupled to one or more other memories 108 (e.g., memories 108 of other NAHA units 102), storages (e.g., system storages), system memories, databases or any combination thereof also communicatively coupled to network 114. In this way, NAHA unit 102 is configured to read and write data (e.g., results, values, variables, program code, instructions) to and from other memories 108 (e.g., memories 108 of other NAHA units 102), storages (e.g., system storages), system memories, databases, or any combination thereof via network 114. For example, in embodiments, a NAHA unit 102 is configured to store results from performing one or more operations for an application (e.g., high-performance application) in a memory 108 of another NAHA unit 102, a system storage, or both via network 114. In this way, a NAHA unit 102 is configured to communicatively couple one or more memories 108 of the NAHA unit 102 to network 114 without the use of one or more peripheral devices (e.g., PCI devices). As such, the number of components needed for processing system 100 is reduced, reducing the cost of the system. Additionally, by connecting the memory 108 of a NAHA unit 102 to network 114 using a NIC 112 within or otherwise connected to the memory 108, the NAHA unit 102 is configured to perform edge computing (e.g., edge interfacing) for applications (e.g., high-performance application) executing on a distributed (e.g., cloud-based) processing system without the use of such peripheral devices. As an example, a NAHA unit 102 is configured to execute one or more instructions for an application (e.g., AI application) executed by a distributed (e.g., cloud-based) processing system by performing one or more operations for the application. After generating one or more results from the performance of such operations, the NAHA unit 102 is configured to store the results in a memory 108 of the NAHA unit 102. Additionally, the NAHA unit 102, via a NIC 112 within the memory 108 and network 114, is configured to store the results in a storage (e.g., cloud-based system storage, database).

One or more NAHA units 102, in embodiments, each include a NIC 112 within or otherwise connected to a cache of the respective NAHA unit 102. For example, one or more NAHA units 102 each include a NIC 112 disposed within (e.g., disposed on the same die as) the cache of the NAHA unit. The NIC 112 within or otherwise connected to the cache 110 is configured to communicatively couple the cache 110 to network 114 such that, for example, the cache 110 is communicatively coupled to one or more other caches 110 (e.g., caches 110 of other NAHA units 102, caches of one or more processors) also communicatively coupled to network 114. In this way, NAHA unit 102 is configured to read and write data (e.g., results, values, variables, instructions, registers files) to and from other caches 110 (e.g., caches 110 of other NAHA units 102, caches of one or more processors) via network 114. As such, for example, a NAHA unit 102 is configured to communicatively couple one or more caches 110 of the NAHA unit 102 to network 114 without the use of one or more peripheral devices (e.g., PCI devices). As such, the number of components needed for processing system 100 is again reduced, reducing the cost of the system.

Further, by connecting the memories 108, caches 110, or both of two or more NAHA units 102 to network 114 using NICs 112 within or otherwise connected to the memories 108 and caches 110, the NAHA units 102 form a data center configured to execute one or more high-performance applications. Such a data center, for example, is configured to execute instructions for such applications in parallel (e.g., data parallelism, model parallelism) as single streams, multistreams, or both using two or more NAHA units 102. To help execute these high-performance applications, one or more memories 108 and caches 110 of each NAHA unit 102 of the data center (e.g., via one or more NICS 112) are communicatively coupled to network 114 such that each NAHA unit 102 is configured to read and write data (e.g., results, instructions, register files) to and from the memories 108 and caches 110 of the other NAHA 102 units of the data center. Additionally, within the data center, one or more NAHA units 102 are configured to switch between multiple modes. Such modes include, for example, include a host device mode, a compute device mode, or both. When in a host device mode, a NAHA unit 102 is configured to permit access to the data center via, for example, a user interface, specialized software, network addresses, protocol stacks, or any combination thereof, manage memory coherency in the data center, manage cache coherency in the data center, manage memories 108 of the data center, manage caches 110 of the data center, issue instructions for one or more applications (e.g., high-performance applications) to NAHA devices 102 of the data center, or any combination thereof. When in a compute device mode, for example, a NAHA device 102 is configured to execute instructions issued from one or more host devices. In this way, the NAHA units 102 of the data center are configured to execute instructions for one or more applications without using a discrete host device, reducing the number of components needed to form the data center. Additionally, to expand the data center, only additional NAHA units 102 (e.g., memories 108 and caches 110 of the NAHA units 102) need to be communicatively coupled to network 114 rather than additional peripheral devices or discrete host devices, reducing the number of components needed to expand the data center and simplifying the expansion of the data center.

In some embodiments, processing system 100 further includes one or more processors (not shown for clarity). Such processors, for example, include central processing units (CPUs), accelerated processing units (APUs), or both. Such an APU includes, for example, any of a variety of parallel processors, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. Such processors, for example, are configured to execute applications (e.g., high-performance applications). To help these processors execute such applications, the processors are communicatively coupled to one or more NAHA units 102 using network 114, one or more communication protocols (e.g., ethernet, universal serial bus (USB), Thunderbolt, PCI), a bus, or any combination thereof. Further, each processor of processing system 100 is configured to issue one or more instructions of an application to a NAHA 102 communicatively coupled to the processor. In response to receiving an instruction from the processor, a NAHA unit 102 is configured to execute the instruction on behalf of the processor by, for example, performing one or more operations indicated in the received instruction. After performing one or more operations, the NAHA unit 102 is configured to provide results (e.g., data resulting from the performance of one or more operations) back to the processor. In this way, the NAHA unit 102 executes instructions for applications (e.g., high-performance applications) on behalf of the processor, increasing the processing efficiency of the processing system 100.

Figure 2:
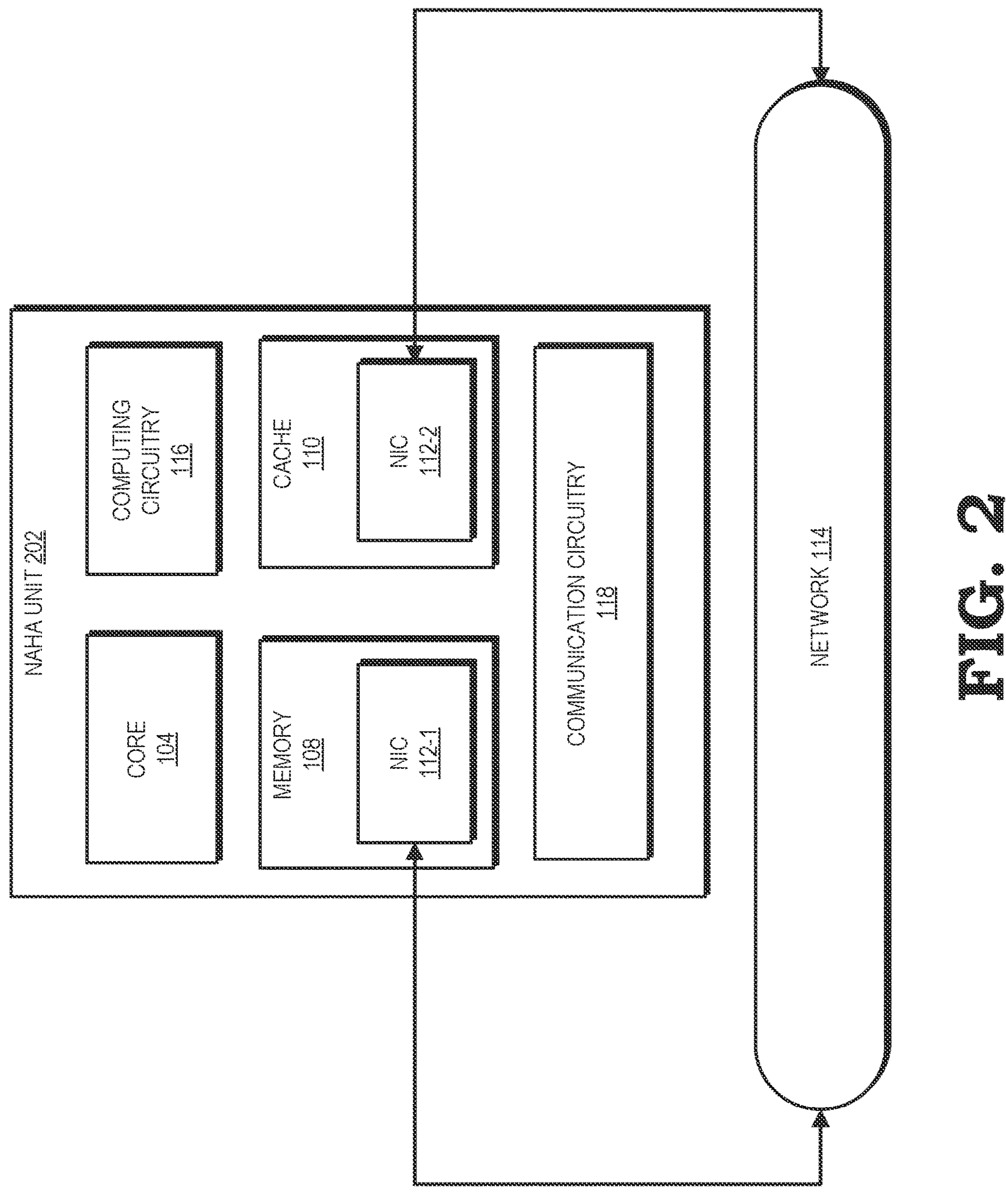
FIG. 2 is a block diagram of an example NAHA unit, in accordance with some embodiments.

Referring now to FIG. 2, an example NAHA unit 202, similar to or the same of NAHA unit 102, is presented. In embodiments, NAHA unit 202 forms an integrated circuit (e.g., system on a chip) that includes processor core 104, memory 108, cache 110, computing circuitry 116, and computing circuitry 116. Further, NAHA unit 202 includes one or more NICs 112 included in or otherwise connected to memory 108, cache 110, or both. As an example, NAHA unit 202 includes a first NIC 112-1 included in memory 108 and a second NIC 112-2 included in cache 110. In embodiments, one or more NICs 112 of the NAHA unit 202 are configured to communicatively couple memory 108, cache 110, or both to network 114 using one or more communication protocols. For example, NAHA unit 202 includes two NICs (e.g., 112-1, 112-2) each configured to communicatively couple memory 108 and cache 110, respectively, to network 114 using Ethernet, Wi-Fi, Bluetooth, internet protocols, cellular protocols, or any combination thereof. According to embodiments, one or more NICs 112 of NAHA unit 202 are configured to communicatively couple memory 108, cache 110, or both to network 114 such that memory 108 is communicatively coupled to one or more memories of other NAHA units, a storage (e.g., system storage, cloud-based storage database, database), system memory, or any combination thereof, also communicatively coupled to network 114; cache 110 is communicatively coupled to one or more caches of other NAHA units, one or more caches of one or more processors (e.g., CPUs, APUs), or both also communicatively coupled to network 114; or both. Though the example embodiment illustrated in FIG. 2 presents memory 108 including a respective NIC 112-1 and cache 110 including a respective NIC 112-2, in other embodiments, memory 108 and cache 110 may each include or be otherwise connected to any number of NICs.

To facilitate one or more NICs 112 communicatively coupling memory 108, cache 110, or both to network 114 using one or more communication protocols, NAHA unit 202 includes communication circuitry 118. Communication circuitry 118, for example, includes hardware-based circuitry, software-based circuitry, or both configured to connect one or more NICs 112 to network 114. For example, communication circuitry 118 includes one or more ports (e.g., Ethernet ports, USB ports, Thunderbolt ports, optical ports, serial ports, parallel ports) connected to one or more NICs 112 and configured to accept one or more connectors (e.g., Ethernet connectors, USB connectors, Thunderbolt connectors) configured to communicatively couple the NICs 112 to network 114. For example, communication circuitry 118 includes one or more Ethernet ports each connected to one or more NICs 112 and configured to communicatively couple the NICs 112 to network 114. As another example, communication circuitry 118 includes one or more radios (e.g., Bluetooth radios, Wi-Fi radios, cellular radios) each connected to one or more NICs 112 and configured to communicatively coupled a NIC 112 to network 114. For example, communication circuitry 118 includes a Wi-Fi radio connected to a NIC 112 and configured to communicatively couple the NIC 112 to network 114.

According to embodiments, communication circuitry 118 includes hardware-based circuitry, software-based circuitry, or both configured to communicatively couple one or more processor cores 104, memory 108, cache 110, or any combination thereof to one or more external processing systems. Such external processing systems include, for example, computers, laptops, tablet computers, compute-enabled phones (smartphones), or any combination thereof. To this end, in embodiments, communication circuitry 118 includes one or more ports (e.g., Ethernet ports, USB ports, Thunderbolt ports, optical ports, serial ports, parallel ports) connected to one or more processor cores 104, memory 108, cache 110, or any combination thereof and configured to accept one or more connectors (e.g., ethernet connectors, USB connectors, Thunderbolt connectors) configured to communicatively couple one or more processor cores 104, memory 108, cache 110, or any combination thereof to one or more external processing systems. For example, communication circuitry 118 includes one or more USB ports each connected to one or more processor cores 104, memory 108, cache 110, or any combination thereof and configured to communicatively couple the one or more processor cores 104, memory 108, cache 110, or any combination thereof to a computer. Further, in some embodiments, communication circuitry 118 includes one or more radios (e.g., Bluetooth radios, Wi-Fi radios, cellular radios) each connected to one or more processor cores 104, memory 108, cache 110, or any combination thereof and configured to communicatively coupled one or more processor cores 104, memory 108, cache 110, or any combination thereof to an external processing system. For example, communication circuitry 118 includes a Bluetooth radio connected to one or more processor cores 104, memory 108, cache 110, or any combination thereof and configured to communicatively couple the one or more processor cores 104, memory 108, cache 110, or any combination thereof to a smartphone. In this way, NAHA unit 202 is configured to perform instructions for one or more applications (e.g., high-performance applications) being executed on an external processing system. That is to say, NAHA unit 202 is configured to perform one or more instructions of an application on behalf of an external processing system. As an example, using communication circuitry 118, an external processing system issues one or more instructions to NAHA unit 202 to execute on behalf of the processing system. In response to receiving the instructions, processor core 104 is configured to execute the instructions, and, using communication circuitry 118, provide results (e.g., data resulting from executing the instructions) back to the external processing system.

According to embodiments, NAHA unit 202 is configured to operate in and switch between a host device mode and a compute device mode. When in a host device mode, NAHA unit 202 is configured to permit access to memories 108, caches 110, or both of other NAHA units also communicatively coupled to network 114 (e.g., via, for example, a user interface, specialized software, network addresses, protocol stacks, or any combination thereof), manage memory coherency for one or more memories 108 of one or more NAHA units communicatively coupled to network 114, manage cache coherency for one or more caches 110 of one or more NAHA units communicatively coupled to network 114, issue instructions for one or more applications (e.g., high-performance applications) to one or more memories, caches, or both of NAHA devices 102 communicatively coupled to network 114, or any combination thereof. When in a compute device mode, for example, NAHA unit 202 is configured to execute instructions received from memory 108, one or more external processing systems, one or more NAHA units communicatively coupled to network 114, or any combination thereof. To support NAHA unit 202 operating in a host device mode, NAHA unit 202 includes computing circuitry 116. Computing circuitry 116 includes, for example, hardware-based circuitry, software-based circuitry, or any combination thereof configured to perform one or more operations to support a host device mode. That is to say, computing circuitry 116 is configured to perform one or more operations to support permitting access to memories 108, caches 110, or both of other NAHA units also communicatively coupled to network 114, managing memory coherency for one or more memories 108 of one or more NAHA units communicatively coupled to network 114, managing cache coherency for one or more caches 110 of one or more NAHA units communicatively coupled to network 114, issuing instructions for one or more applications (e.g., high-performance applications) to one or more memories, caches, or both of NAHA devices 102 communicatively coupled to network 114, or any combination thereof. Such operations supported by computing circuitry 116 include, for example, generating memory snoops, generating cache snoops, accessing memory coherency directories, modifying memory coherency directories, accessing cache coherency directories, modifying cache coherency directories, authenticating users, or any combination thereof.

Figure 3:
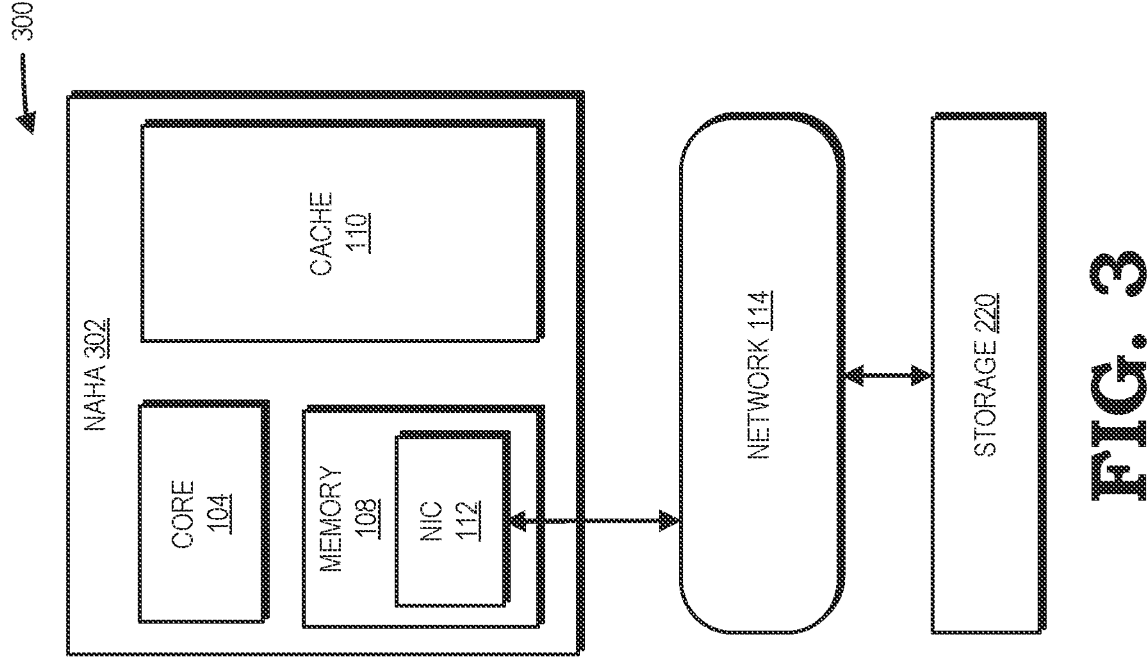
FIG. 3 is a block diagram of a NAHA unit configured to perform edge computing within a distributed network, in accordance with some embodiments.

Referring now to FIG. 3, a NAHA unit 302 configured to perform edge computing within a distributed network 300 is presented in accordance with some embodiments. According to embodiments, NAHA unit 302, similar to or the same as NAHA units 102, 202, is configured to perform edge computing (e.g., edge interfacing) within, for example, distributed processing system 300. Distributed processing system 300 includes, for example, a cloud-based processing system, Internet of Things (IOT) processing system, or both. According to embodiments, distributed network 300 is configured to execute one or more applications (e.g., high-performance applications). For example, distributed network 300 is configured to execute a neural network, AI application, or both. To support the execution of the applications by the distributed network 300, NAHA unit 302 forms an integrated circuit (e.g., SoC) that includes one or more processor cores 104, memories 108, and caches 110. According to some embodiments, NAHA unit 302 is embedded (e.g., disposed) within one or more devices of distributed network 300 configured to perform edge computing (e.g., edge interfacing) for distributed network 300. Further, NAHA unit 302 includes NIC 112 within (e.g., disposed on a same die as) or otherwise connected to memory 108. In embodiments, NIC 112 is configured to couple memory 108 to network 114 (e.g., a LAN, wireless LAN, WAN, wireless WAN) using one or more communication protocols (e.g., Ethernet, Wi-Fi, Bluetooth, internet protocols, cellular protocols) such that a memory 108 of NAHA unit 302 is communicatively coupled to a storage 220 of distributed processing system 300. Storage 220 includes, for example, a cloud-based memory storage, a cloud-based memory, a database, or any combination thereof configured to store data (e.g., results, program code, instructions) associated with one or more applications (e.g., high-performance applications) executed by the distributed network.

According to embodiments, one or more processor cores 104 of NAHA unit 302 are configured to execute instructions for one or more applications (e.g., high-performance applications) run by distributed network 300. To this end, one or more processor cores 104 of NAHA unit 302 are configured to receive one or more instructions for an application from a memory 108 (e.g., from a program code stored in a memory 108), storage 220 (e.g., from a program code stored in storage 220 via network 114), or both. In response to receiving an instruction, a processor core 104 executes the instructions and stores results (e.g., data resulting from the execution of the instruction) in memory 108. As an example, a processor core 104 is configured to operate as one or more compute units each configured to perform operations indicated in one or more received instructions in parallel. In response to receiving an instruction, the compute units perform one or more operations indicated in the received instruction and store data resulting from the performance of the operations (e.g., results) in memory 108. After one or more results are stored in memory 108, NAHA unit 302 is configured to provide the results to storage 220 via NIC 112 and network 114. That is to say, NAHA unit 302, using NIC 112 to interface with network 114, sends one or more results over network 114 to storage 220. In this way, NAHA unit 302 is configured to perform edge computing (e.g., edge interfacing) for distributed network 114.

Figure 4:
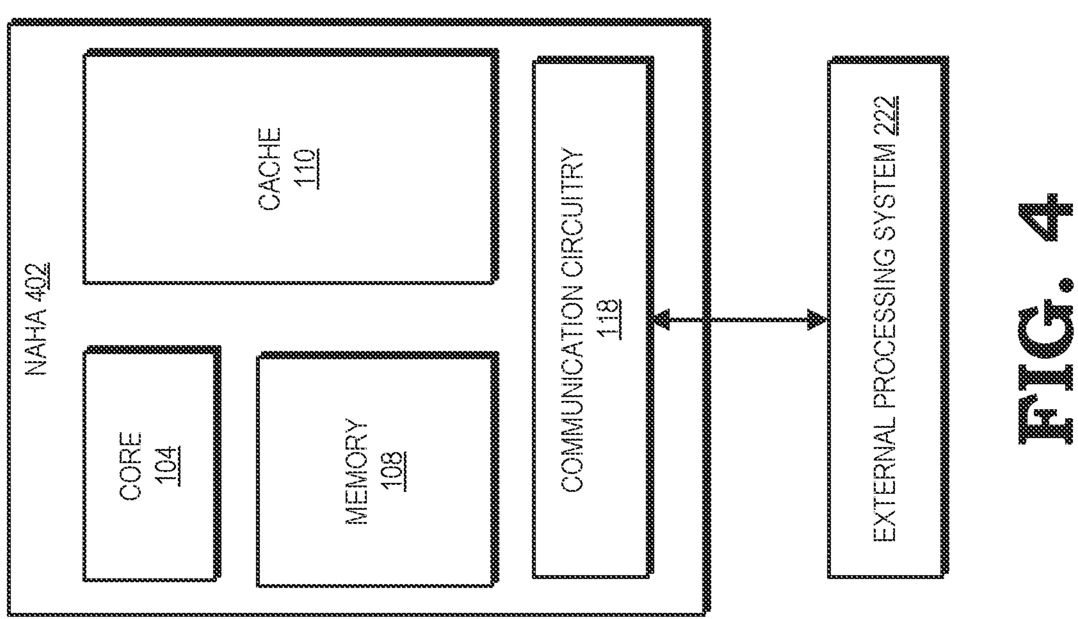
FIG. 4 is a block diagram of a NAHA unit configured to execute instructions on behalf of an external processing system, in accordance with some embodiments.

Referring now to FIG. 4, a NAHA unit 402 configured to execute instructions on behalf of external processing system 222 is presented in accordance with some embodiments. External processing system 222 includes one or more devices that include one or more CPUs, APUs, or both. For example, external processing system 222 includes computers, laptops, tablet computers, smartphones, or any combination thereof. In embodiments, external processing system 222 is configured to execute one or more applications (e.g., high-performance applications). To help support the performance of these applications, NAHA unit 402, similar to or the same as NAHA units 102, 202, 302, is configured to execute one or more instructions of these applications on behalf of external processing system 222. To this end, NAHA unit 402 forms an integrated circuit (e.g., SoC) that includes one or more processor cores 104, memories 108, and caches 110.

Additionally, NAHA unit 402 includes communication circuitry 118 configured to communicatively couple NAHA unit 402 to external processing system 222 (e.g., one or more processors, CPUs, or APUs of external processing system 222). For example, communication circuitry 118 includes one or more one or more ports (e.g., Ethernet ports, USB ports, Thunderbolt ports, optical ports, serial ports, parallel ports) connected to one or more processor cores 104, memories 108, caches 110, or any combination thereof of NAHA unit 402. Additionally, such ports are configured to accept one or more connectors (e.g., ethernet connectors, USB connectors, Thunderbolt connectors) that are configured to communicatively couple one or more processor cores 104, memories 108, caches 110, or any combination of thereof of NAHA unit 402 to external processing system 222 (e.g., one or more processors, memories, or caches of external processing system 222). For example, communication circuitry 118 includes one or more USB ports each connected to one or more processor cores 104, memories 108, caches 110, or any combination thereof of NAHA unit 402 and configured to communicatively couple the one or more processor cores 104, memories 108, caches 110, or any combination thereof to a processor and memory of external processing system 222. Further, in some embodiments, communication circuitry 118 includes one or more radios (e.g., Bluetooth radios, Wi-Fi radios, cellular radios) each connected to one or more processor cores 104, memories 108, caches 110, or any combination thereof of NAHA unit 402 and configured to communicatively couple one or more processor cores 104, memories 108, caches 110, or any combination thereof of NAHA unit 402 to external processing system 222 (e.g., one or more processors, memories, or caches of external processing system 222). For example, communication circuitry 118 includes a Wi-Fi radio connected to one or more processor cores 104, memories 108, caches 110, or any combination thereof of NAHA unit 402 and configured to communicatively couple the one or more processor cores 104, memories 108, and caches 110 to a processor and memory of external processing system 222.

According to embodiments, one or more processor cores 104 of NAHA unit 402 are configured to receive one or more instructions from external processing system 222 via communication circuitry 118. For example, one or more processor cores 104 of NAHA unit 402 are configured to receive one or more instructions for one or more applications (e.g., high-performance applications) executing on external processing system 222. In response to receiving an instruction, a processor core 104 of NAHA unit 402 is configured to execute the instructions on behalf of external processing system 222 and store results (e.g., data resulting from the execution of the instruction) in, for example, a memory 108. As an example, a processor core 104 is configured to operate as one or more compute units configured to perform one or more operations indicated in a received instruction in parallel. In response to receiving an instruction, the compute units perform one or more operations indicated in the instruction and store data resulting from the performance of the operations in a memory 108. After determining one or more results, NAHA unit 402 is configured to provide the determined results to external processing system 222 (e.g., a memory of external processing system 222) via communication circuitry 118. For example, NAHA unit 402 provides one or more results stored in a memory 108 to external processing system 222. In this way, NAHA unit 402 is configured to execute instructions on behalf of external processing system 222 to support one or more applications running on external processing system 222.

Referring now to FIG. 5, a data center 500 including two or more NAHA units is presented in accordance with some embodiments. According to embodiments, two or more NAHA units 502, similar to or the same as NAHA units 102, 202, 302, 402, each forms integrated circuits (e.g., SoCs) and includes a respective processor core 104, memory 108, cache 110, and computing circuitry 116. Additionally, each NAHA unit 502 includes a first NIC 112 within (e.g., disposed on a same die as) or otherwise connected to the memory 108 of the NAHA unit 502 and a second NIC 112 within or otherwise connected to the cache 110 of the NAHA unit 502. Though the example embodiment illustrated in FIG. 5 presents data center 500 including three NAHA units (502-1, 502-2, 502-N) representing an N number of NAHA units 502, in other embodiments, data center 500 can include any number of NAHA units 502. Additionally, while the example embodiment illustrated in FIG. 5 presents each NAHA unit 502 including a respective NIC (112-1, 112-2, 112-3, 112-4, 112-5, 112-M) for the memory 108 and cache 110 of the NAHA unit 502, in other embodiments, each NAHA unit 502 may have any number of NICs 112 included in or otherwise connected to the memory 108 and cache 110 of the NAHA unit 502.

In embodiments, within each NAHA unit 502, the NIC 112 included in or otherwise connected to the memory 108 is configured to communicatively couple the memory 108 to memory network 524 using one or more communication protocols (e.g., Ethernet, Wi-Fi, Bluetooth, internet protocols, cellular protocols) such that the memory 108 of the NAHA unit 502 is communicatively coupled to the memories 108 of the other NAHA units 502 in data center 500. Memory network 524 includes, for example, a LAN, wireless LAN, WAN, wireless WAN, or any combination thereof configured to communicatively couple the memories 108 of each NAHA unit 502 together. Further, in embodiments, memory network 524 is configured to communicatively couple each memory 108 of the NAHA units 502 to storage 520. Storage 520, for example, includes a system memory storage, system memory, database, or any combination thereof. Further, within each NAHA unit 502, the NIC 112 included in (e.g., disposed on a same die as) or otherwise connected to the cache 110 is configured to communicatively couple the cache 110 to cache network 526 using one or more communication protocols (e.g., Ethernet, Wi-Fi, Bluetooth, internet protocols, cellular protocols) such that the cache 110 of the NAHA unit 502 is communicatively coupled to the caches 110 of the other NAHA units 502 in data center 500. Cache network 526 includes, for example, a LAN, wireless LAN, WAN, wireless WAN, or any combination thereof configured to communicatively couple the caches 110 of each NAHA unit 502 together.

According to embodiments, data center 500 is configured to execute one or more applications (e.g., high-performance applications), for example, AI applications, neural network applications, data center applications, HPC applications, or any combination thereof. To this end, one or more NAHA units 502 of data center 500 are configured to operate in a host device mode. When operating in such a host device mode, a NAHA unit 502 is configured to permit access to data center 500 via, for example, a user interface, specialized software, network addresses, protocol stacks, or any combination thereof, manage memory coherency in data center 500, manage cache coherency in data center 500, manage memories 108 of data center 500, manage caches 110 of data center 500, issue instructions for one or more application (e.g., high-performance applications) to NAHA devices 502 of data center 500, or any combination thereof. For example, while operating in a host device mode, a NAHA unit 502 is configured to support applications executing on data center 500 by issuing one or more instructions (e.g., workloads) to one or more NAHA units 502 operating in a compute device mode (e.g., operating in a mode that executes one or more received instructions). In response to receiving an instruction from, for example, a NAHA unit 502 operating in a host device mode, a NAHA unit 502 operating in a compute device mode executes the received instructions using, for example data (e.g., program code, instructions, register files, values, results, variables, operands) stored in a memory 108 of the NAHA unit 502, one or more memories 108 of other NAHA units 502 (e.g., via memory network 524), a cache 110 of the NAHA unit 502, one or more caches 110 of other NAHA units 502 (e.g., via cache network 526), or any combination thereof. For example, a NAHA unit 502 operating in a compute device mode executes received instructions using one or more results stored in the cache 110 of another NAHA unit 502 using cache network 526.

After executing at least a portion of (e.g., one or more operations of) one or more instructions, a NAHA unit 502 operating in a compute device mode stores results (e.g., data resulting from the performance of the instructions) in the memory 108 of the NAHA unit 502, one or more memories 108 of other NAHA units 502 (e.g., via memory network 524), storage 520 (e.g., via memory network 524), the cache 110 of the NAHA unit 502, one or more caches 110 of other NAHA units 502 (e.g., via cache network 526), or any combination thereof. In this way, the memories 108 and caches 110 of each NAHA unit 502 are shared with each NAHA unit 502 in data center 500, improving the processing efficiency of data network 500 by increasing the amount of memory and caches available for a NAHA unit 502 to use when executing instructions. Additionally, cache network 526 allows results determined at a first NAHA unit 502 to be shared with a second NAHA unit 502 that requires such results to execute instructions, also increasing the processing efficiency of data center 500.

In embodiments, one or more NAHA units 502 operating in a host device mode are configured to maintain memory consistency, memory coherency, or both within data center

500 across the memories 108 of the NAHA units 502 and storage 520. For example, a NAHA unit 502 operating in a host device mode is configured to maintain memory consistency within data center 500 by issuing instructions to one or more NAHA units 502 operating according to one or more memory consistency models (e.g., strict consistency, sequential consistency, processor consistency, weak consistency). That is to say, the NAHA unit 502 operating in a host device mode helps ensure memory consistency across the memories 108 of the NAHA units 502 and storage 520 by issuing instructions according to one or more requirements (e.g., orderings for issuing instructions) indicated in one or more memory consistency models. To this end, a NAHA unit 502 operating in a host-device mode includes computing circuitry 116 configured to determine one or more orderings for issuing instructions based on one or more memory consistency models. After determining such orderings, the NAHA unit 502 then issues one or more instructions to one or more other NAHA units 502 according to the determined ordering. Additionally, a NAHA unit 502 operating in a host device mode is configured to maintain memory coherency within data center 500 across the memories 108 of the NAHA units 502 and storage 200 by issuing (e.g., via memory network 524) memory snoops to one or more memories 108 of NAHA units 502, storage 520, or both, accessing memory coherency directories, modifying memory coherency directories, or any combination thereof. To this end, a NAHA unit 502 operating in a host device mode includes computing circuitry 116 configured to generate such memory snoops, instructions to modify memory coherency directories, instructions requesting data from memory coherency directories, or any combination thereof. According to embodiments, one or more NAHA units 502 operating in a host device mode are configured to maintain cache coherency within data center 500 across the caches 110 of the NAHA units 502 by, for example, issuing (e.g., via cache network 526) cache snoops to one or more caches 110 of NAHA units 502, accessing cache coherency directories, modifying cache coherency directories, or any combination thereof. To this end, a NAHA unit 502 operating in a host device mode includes computing circuitry 116 configured to generate such cache snoops, instructions to modify cache coherency directories, instructions requesting data from cache coherency directories, or any combination thereof.

In this way, two or more NAHA units 502 form data center 500 without using peripheral devices (e.g., PCI devices), discrete host devices, or any combination thereof. As such, the architecture of data center 500 is simplified, reducing the complexity and cost of designing data center 500. Additionally, to expand data center 500, only additional NAHA units 502 need to be added to data center 500 rather than additional peripheral devices or dedicated host devices. As such, the complexity of expanding data center 500 is reduced.

Figure 6:
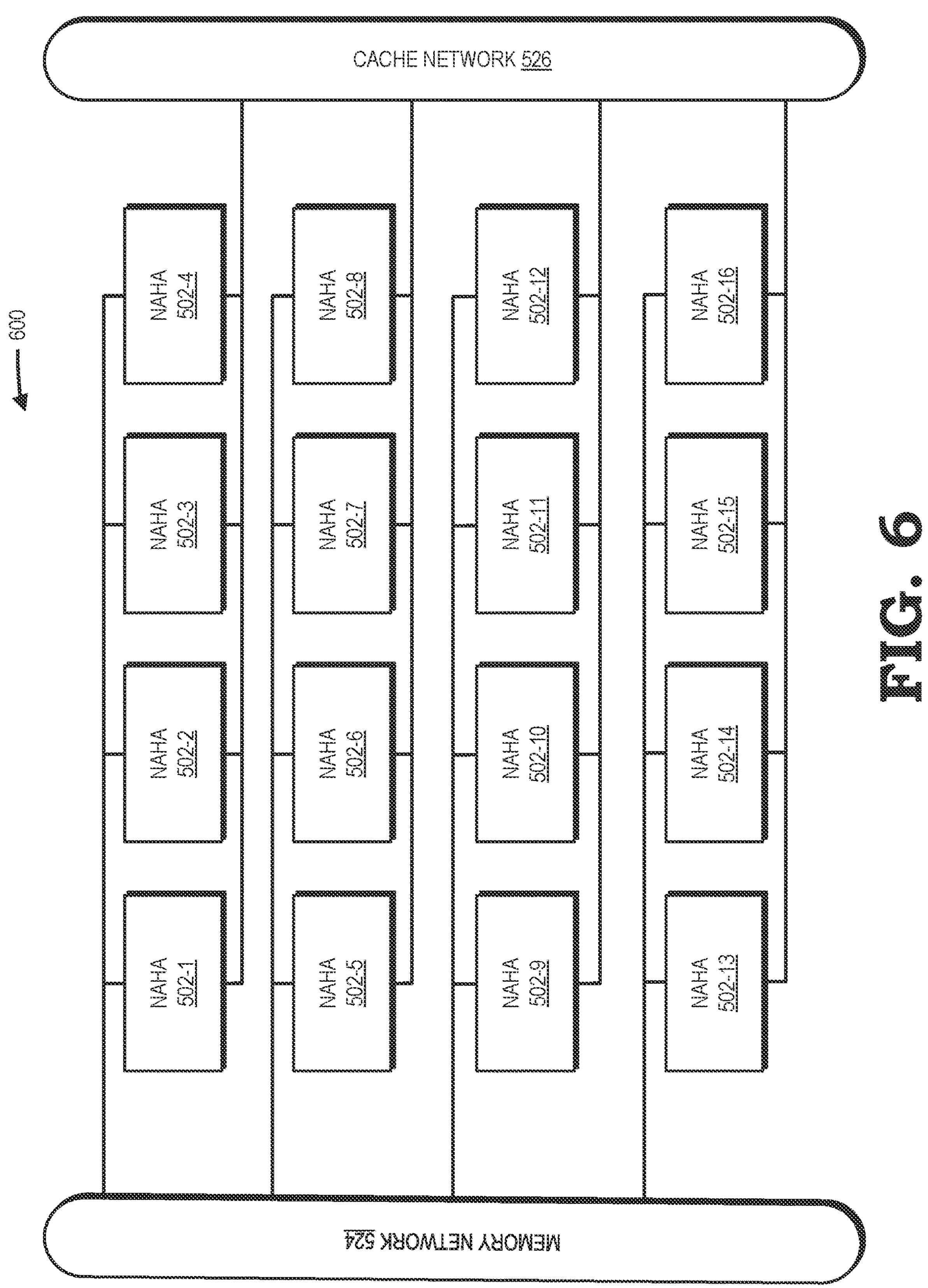
FIG. 6 is a block diagram of an example architecture for a data center including two or more NAHA units, in accordance with some embodiments.

FIG. 6 presents an example architecture 600 for a data center including two or more NAHA units. In embodiments, a data center, similar to or the same as data center 500, is formed by two or more NAHA units 502. Each NAHA unit 502, for example, includes a processor core 104, memory 108, and cache 110. Each NAHA unit 502 further includes a first NIC 112 within or otherwise connected to a respective memory 108 and a second NIC 112 within or otherwise connected to a respective cache 110. The NIC 112 within or otherwise connected to the memory 108 of a NAHA unit 502 is configured to communicatively couple the memory 108 of the NAHA unit 502 to memory network 524 (e.g., LAN, wireless LAN, WAN, wireless WAN) such that the memory 108 of the NAHA unit 502 is communicatively coupled to each other memory 108 of the other NAHA units 502 in the data center. As an example, the example architecture presented in FIG. 6 presents sixteen NAHA units 502 each having a respective memory communicatively coupled to memory network 524 such that the memory 108 is communicatively coupled to each other memory 108 of the other NAHA units 502 in the data center.

Further, within architecture 600, the NIC 112 within (e.g., disposed on a same die as) or otherwise connected to the cache 110 of a NAHA unit 502 is configured to communicatively couple the cache 110 of the NAHA unit 502 to cache network 526 (e.g., LAN, wireless LAN, WAN, wireless WAN) such that the cache 110 of the NAHA unit 502 is communicatively coupled to each other cache 110 of the other NAHA units 502 in the data center. As an example, the example architecture presented in FIG. 6 presents sixteen NAHA units 502 each having a respective cache 110 communicatively coupled to memory network 524 such that the cache 110 is communicatively coupled to each other cache 110 of the other NAHA units 502 in the data center. In this way, example architecture 600 includes two or more NAHA units 502 forming a data center in which the memories 108 and caches 110 of each NAHA unit 502 within the data center are shared with one another. Though the example architecture 600 presented in FIG. 6 includes 16 NAHA units (502-1, 502-2, 502-3, 502-4, 502-5, 502-6, 502-7, 502-8, 502-9, 502-10, 502-11, 502-12, 502-13, 502-14, 502-15, 502-16) forming a data center, in other embodiments, architecture 600 includes any number of NAHA units 502 forming a data center.

Figure 7:
FIG. 7 is a block diagram of an example implementation for one or more NAHA units, in accordance with some embodiments.
Figure 7:
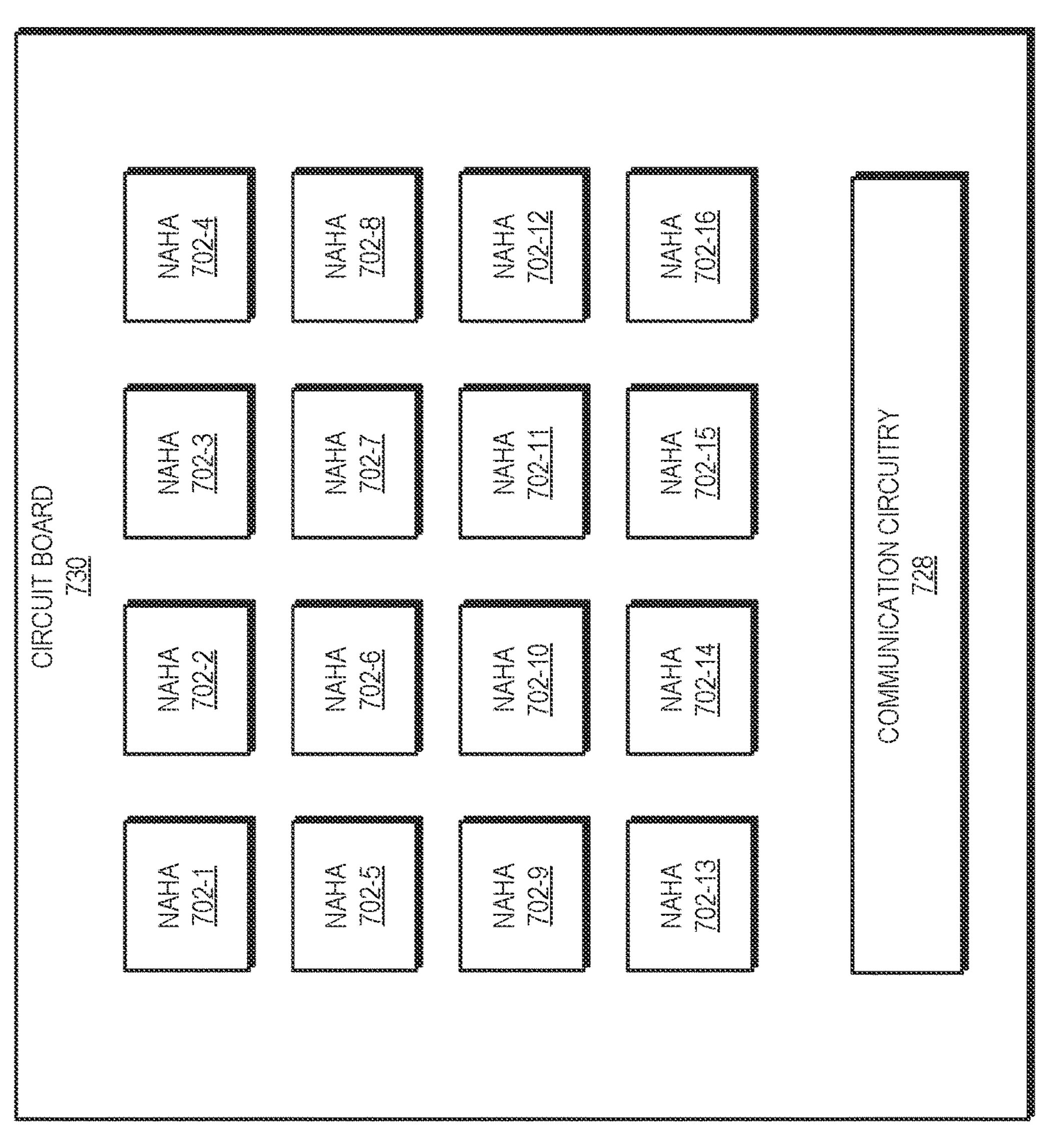

Referring now to FIG. 7, an example implementation 700 for one or more NAHA units is presented. According to embodiments, example implementation 700 includes one or more NAHA units 702, similar to or the same as NAHA units 102, 202, 302, 402, 502, disposed on a circuit board including a substrate and one or more electrical connections (e.g., traces, vias). Each NAHA unit 702, for example, includes an integrated circuit (e.g., SoC) including one or more processor cores 104, memories 108, caches 110, computing circuitry 116, or any combination thereof. Additionally, each NAHA unit 702 includes one or more NICs 112 within (e.g., disposed on a same die as) or otherwise connected to one or more memories 108, caches 110, or both of the NAHA unit 702. Though the example embodiment presented in FIG. 7 illustrates sixteen NAHA units (702-1, 702-2, 702-3, 702-4, 702-5, 702-6, 702-7, 702-8, 702-9, 702-10, 702-11, 702-12, 702-13, 702-14, 702-15, 702-16) disposed on circuit board 730, in other embodiments, any number of NAHA units 702 may be disposed on circuit board 730.

In embodiments, circuit board 730 further includes communication circuitry 728 having hardware-based circuitry, software-based circuitry, or both configured to communicatively couple each NAHA unit 702 disposed on circuit board 730 to one or more networks 114. For example, communication circuitry 728 is configured to communicatively couple one or more NICs 112 of each NAHA unit 702 included in or otherwise connected to a memory 108 of the NAHA unit 702 to a first network (e.g., memory network 524), one or more NICs 112 of each NAHA unit 702 included in or otherwise connected to a cache 110 of the NAHA unit 702 to a second network (e.g., cache network 526), or both. To this end, communication circuitry 728 includes one or more ports (e.g., ethernet ports, USB ports, Thunderbolt ports, optical ports, serial ports, parallel ports)

connected to the NICs 112 included in otherwise connected to the memories 108, caches 110, or both of each NAHA unit 702 disposed on circuit board 730. Additionally, such ports are configured to accept one or more connectors (e.g., ethernet connectors, USB connectors, Thunderbolt connectors) to communicatively couple the NICs 112 to one or more networks 114. For example, communication circuitry 728 includes one or more ethernet ports each to a respective NICs 112 included in otherwise connected to the memories 108, caches 110, or both of each NAHA unit 702. Further, in some embodiments, communication circuitry 728 includes one or more radios (e.g., Bluetooth radios, Wi-Fi radios, cellular radios) connected to the NICs 112 included in otherwise connected to the memories 108, caches 110, or both of each NAHA unit 702 disposed on circuit board 730. For example, communication circuitry 118 includes one or more Wi-Fi radios connected to the NICs 112 included in otherwise connected to the memories 108, caches 110, or both of each NAHA unit 702 disposed on circuit board 730.

Figure 8:
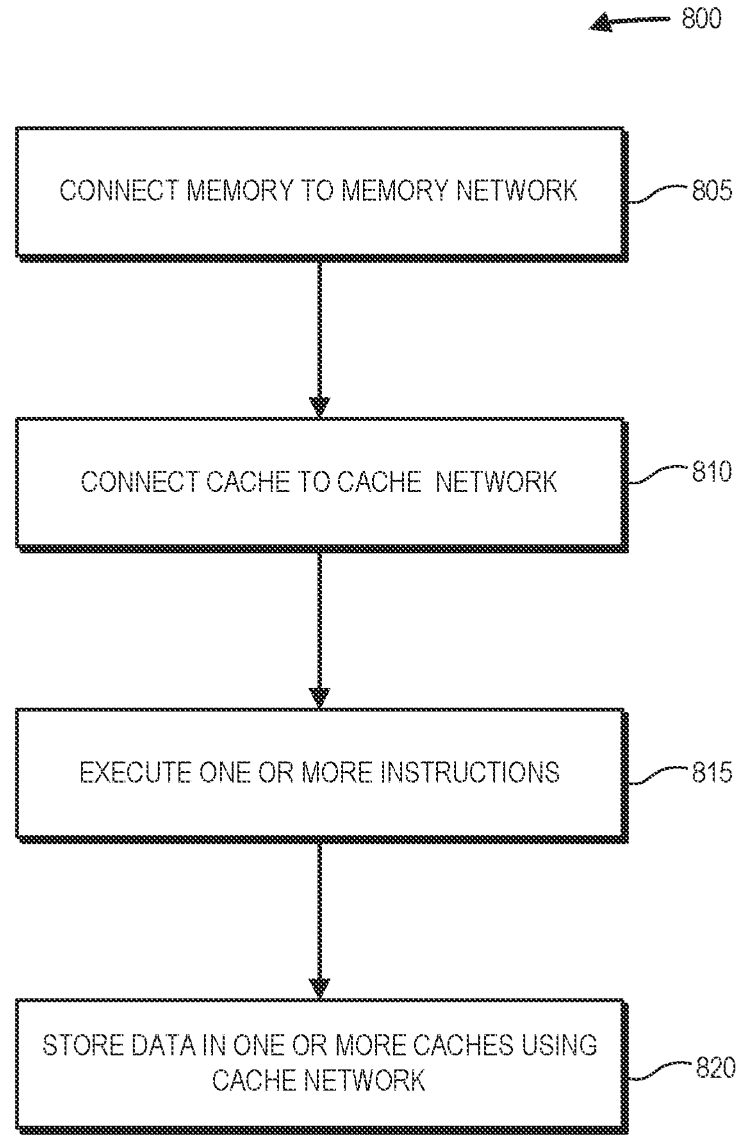
FIG. 8 is a flow diagram illustrating a method for a NAHA unit executing one or more instructions, in accordance with some embodiments.

Referring now to FIG. 8, an example method 800 for a NAHA unit executing one or more instructions is presented, in accordance with some embodiments. In embodiments, step 805 of method 800 includes a NAHA unit, similar to or the same as NAHA units 102, 202, 302, 402, 502, 702, connecting to memory network 524. To this end, the NAHA unit includes a memory 108 and a first NIC 112 within or otherwise connected to the memory 108 and configured to communicatively couple the memory 108 to one or more networks 114 (e.g., LAN, wireless LAN, WAN, wireless WAN) using one or more communication protocols (e.g., Ethernet, Wi-Fi, Bluetooth, internet protocols, cellular protocols, internet protocols). For example, in response to the NAHA unit powering on, the first NIC 112 is configured to communicatively couple the memory 108 to a memory network 524 using one or more communication protocols (e.g., Ethernet, Wi-Fi, Bluetooth, internet protocols, cellular protocols, internet protocols). According to embodiments, memory network 524 is further communicatively coupled to the memories 108 of one or more other NAHA units such that each memory 108 of a NAHA unit communicatively coupled to memory network 524 is also communicatively coupled to each other memory 108 of the other NAHA units communicatively coupled to memory network 524.

At step 810, the NAHA unit is configured to connect to cache network 526. To facilitate the connection to cache network 526, the NAHA unit includes a cache 110 and a second NIC 112 within (e.g., disposed on a same die as) or otherwise connected to the cache 110 and configured to communicatively couple the cache 110 to one or more networks 114 (e.g., LAN, wireless LAN, WAN, wireless WAN) using one or more communication protocols (e.g., Ethernet, Wi-Fi, Bluetooth, internet protocols, cellular protocols, internet protocols). For example, in response to the NAHA unit powering on, the memory 108 of the NAHA unit being communicatively coupled to memory network 524, or both, the second NIC 112 is configured to communicatively couple to the cache 110 to a cache network 526 using one or more communication protocols (e.g., Ethernet, Wi-Fi, Bluetooth, internet protocols, cellular protocols, internet protocols). In embodiments, cache network 526 is further communicatively coupled to the caches 110 of one or more other NAHA units such that each cache 110 of a NAHA unit communicatively coupled to cache network 526 is also communicatively coupled to each other memory 108 of the other NAHA units communicatively coupled to cache network 526.

At step 815, the NAHA unit is configured to perform one or more instructions for one or more applications (e.g., high-performance applications). To this end, the NAHA unit includes one or more processor cores 104 each configured to perform instructions. As an example, one or more processor cores 104 of the NAHA unit are configured to operate as one or more compute units each configured to perform one or more operations for a received instruction. In embodiments, the NAHA unit is configured to receive one or more instructions from, for example, an external processing system 222, a storage 520 (e.g., via, memory network 524), one or more memories 108 of other NAHA units (e.g., via memory network 524), one or more caches 110 of other NAHA units (e.g., via cache network 526) or any combination thereof. As an example, the NAHA unit is configured to receive one or more instructions, via memory network 524, from the memory 108 of a NAHA unit operating in a host device mode. In response to receiving one or more instructions, a processor core 104 of the NAHA device (e.g., operating as one or more compute units) is configured to execute the received instructions. At step 820, after executing one or more instructions, one or more operations for one or more instructions, or both, the NAHA device is configured to store results (e.g., data resulting from executing one or more instructions, data resulting from performing one or more operations) in one or more caches 110, for example, the cache 110 of the NAHA unit. As another example, using cache network 526, the NAHA unit is configured to store results in one or more caches 110 of other NAHA units also communicatively coupled to cache network 526. In this way, one or more other NAHA units connected to cache network 526 are configured to use the stored results to execute instructions, perform operations, or both.

In some embodiments, the apparatus and techniques described above are implemented in a system including one or more integrated circuit (IC) devices (also referred to as integrated circuit packages or microchips), such as the NAHA units described above with reference to FIGS. 1-8. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A network-attached hostless accelerator (NAHA) unit, comprising:
- an integrated circuit comprising:
  - a first memory disposed on a same die as a first network interface controller (NIC) configured to communicatively couple the first memory to a first network;
  - a cache including a second NIC configured to communicatively couple the cache to a second network; and
  - one or more processor cores, wherein at least one processor core of the one or more processor cores is configured to:
    - execute one or more instructions to generate a first result and a second result;
    - store, via the first NIC, the first result in a second memory communicatively coupled to the first network; and
    - store, via the second NIC, the second result in a second cache communicatively coupled to the second network.

2. The NAHA unit of claim 1, wherein the second network is communicatively coupled to one or more caches of one or more other NAHA units.

3. The NAHA unit of claim 2, wherein the at least one processor core of the one or more processor cores is configured to:
- maintain cache coherency across the one or more caches of one or more other NAHA units communicatively coupled to the second network.

4. The NAHA unit of claim 1, wherein the first network is communicatively coupled to one or more memories of one or more other NAHA units.

5. The NAHA unit of claim 4, wherein the second memory comprises at least one memory of the one or more memories of the one or more other NAHA units.

6. The NAHA unit of claim 1, wherein the second memory comprises a cloud-based memory storage.

7. A method, comprising:
- communicatively coupling, by a first network interface controller (NIC) of an integrated circuit, a cache of the integrated circuit to a first network;
- communicatively coupling, by a second NIC of the integrated circuit, a memory of the integrated circuit to a second network;
- executing, by the integrated circuit, a first instruction to generate a first result and a second instruction to generate a second result;
- storing, via the first NIC, the first result in a second cache communicatively coupled to the first network; and
- storing, via the second NIC, the second result in a second memory communicatively coupled to the second network.

8. The method of claim 7, further comprising:
- maintaining, by the integrated circuit, cache coherency across the cache and the second cache.

9. The method of claim 7, wherein the second memory is implemented in a corresponding integrated circuit.

10. The method of claim 7, wherein the second memory includes a cloud-based memory storage.

11. A processing system, comprising:
- a cache network;
- a first network-attached hostless accelerator (NAHA) unit including a first integrated circuit comprising:
  - a first cache;
  - a first network interface controller (NIC) included in the first cache and configured to communicatively couple the first cache to the cache network; and
  - one or more processor cores; and
- a second NAHA unit including a second integrated circuit comprising:
  - a second cache;
  - a second NIC included in the second cache and configured to communicatively couple the second cache to the cache network; and one or more processor cores configured to:

execute an instruction to generate a result; and store, by the second NIC, the result in the first cache of the first NAHA.

12. The processing system of claim 11, further comprising:

a memory network, wherein:

the first integrated circuit further comprises:

a first memory; and a third NIC disposed on a same die as the first memory and configured to communicatively couple the first memory to the memory network; and the second integrated circuit further comprises:

a second memory; and a fourth NIC disposed on a same die as the second memory and configured to communicatively couple the second memory to the memory network.

13. The processing system of claim 11, wherein at least one processor core of the one or more processor cores of the first integrated circuit is configured to:

maintain cache coherency between the first cache and second cache via the cache network.

14. The processing system of claim 11, wherein at least one processor core of the one or more processor cores of the first integrated circuit is configured to:

issue one or more instructions to the second integrated circuit for execution by the one or more processor cores of the second integrated circuit.

15. The processing system of claim 11, wherein the one or more processor cores of the first NAHA are configured to execute an instruction using data stored in the second cache of the second NAHA.

16. The processing system of claim 12, wherein the one or more processor cores of the first NAHA are configured to maintain memory coherency across the first memory of the first NAHA and the second memory of the second NAHA.

17. The method of claim 7, further comprising maintaining memory coherency across the memory of the integrated circuit and the second memory.

18. The method of claim 7, wherein the second cache is implemented in a corresponding integrated circuit.

19. The method of claim 7, wherein the integrated circuit is configured to operate in at least a host device mode and a compute device mode.

20. The method of claim 7, further comprising:

receiving, from a second integrated circuit, the first instruction and the second instruction.

* * * * *